June 18, 1940.  G. E. BARNHART  2,204,649
HYDRAULIC CONTROL
Filed June 6, 1938  2 Sheets-Sheet 1
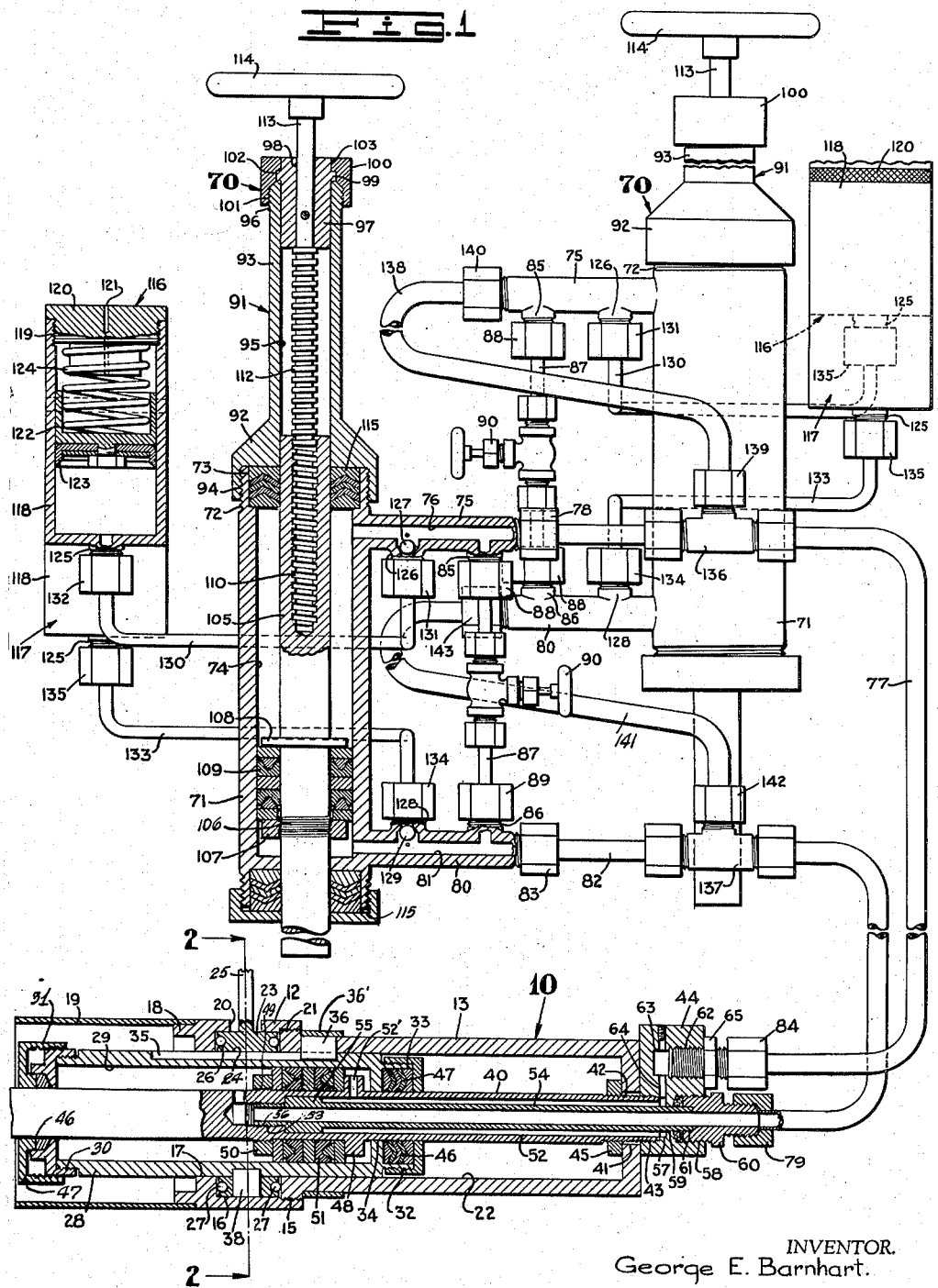
INVENTOR.
George E. Barnhart.
BY
ATTORNEY.

June 18, 1940.         G. E. BARNHART         2,204,649
HYDRAULIC CONTROL
Filed June 6, 1938          2 Sheets-Sheet 2
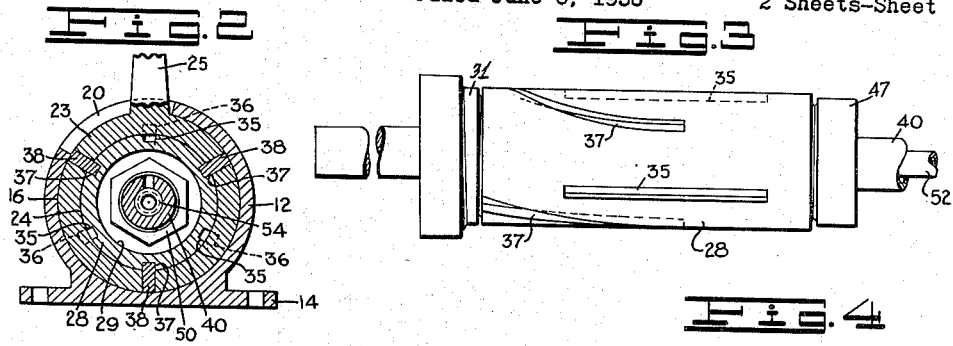
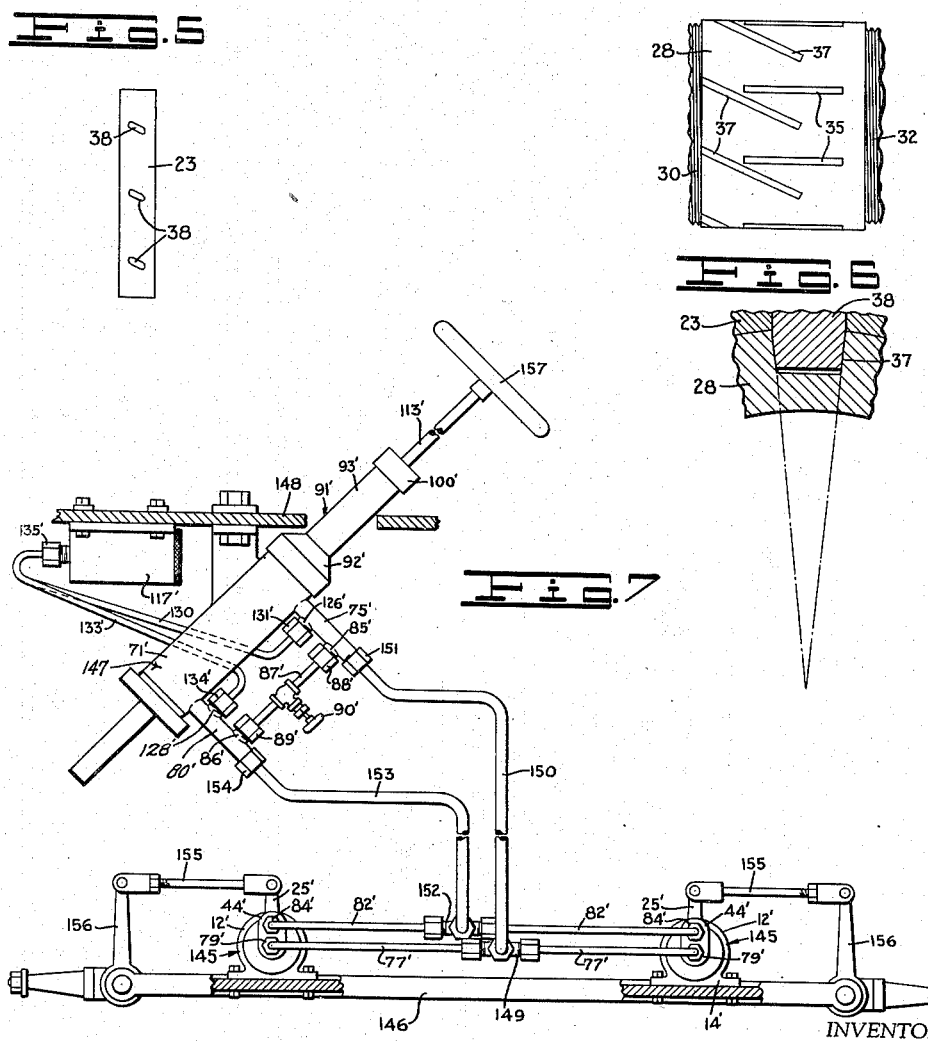
INVENTOR.
George E. Barnhart.
BY
ATTORNEY.

Patented June 18, 1940

2,204,649

UNITED STATES PATENT OFFICE 2,204,649

HYDRAULIC CONTROL

George E. Barnhart, Pasadena, Calif.

Application June 6, 1938, Serial No. 212,030

3 Claims. (Cl. 60—54.6)

This invention relates to improvements in a novel control member and a system for remotely operating the same.

The general object of the invention is to provide a novel self-locking hydraulically operated control member.

A further object of the invention is to provide a novel hydraulically operated control member which may be operated by one or more operating members.

A still further object of the invention is to provide means whereby two or more of the control members may be actuated by one operating member.

An additional object of my invention is to provide a control member including a novel key and keyway construction.

Other objects and the advantages of this invention will be apparent from the following description taken in connection with the accompanying drawings, wherein:

Fig. 1 is a central longitudinal section through my improved control member showing it operatively connected to a plurality of operating members and with one of the operating members and one of the pressure maintenance reservoirs in section;

Fig. 2 is a section taken on line 2—2 of Fig. 1;

Fig. 3 is an elevation of the movable cylinder removed from the housing;

Fig. 4 is a fragmentary development of the movable cylinder on a reduced scale;

Fig. 5 is a development of the interior face of the sleeve member;

Fig. 6 is a fragmentary, enlarged, sectional detail; and

Fig. 7 is a view showing a pair of the control members adapted to operate the steering mechanism of an automobile and being operated by a single operating member.

Referring to the drawings by reference characters I have indicated my improved hydraulically operated control member generally at 10. As shown the device includes a support member 12 and a housing member 13.

As shown in Fig. 2 the support 12 includes suitably apertured flange portions 14 by means of which it may be mounted on any desired support. At one end the support 12 has a threaded aperture 15 therein and a reduced recess 16 which opens into the threaded aperture.

Opposite the threaded aperture 15 the support 12 has an aperture 17 therein which is of less diameter than the recess 16 and opens thereinto. Spaced from and surrounding the aperture 17 the support has a flange portion 18 projecting therefrom on which is mounted an elongated hollow dust cap 19 the end of which opposite the flange 18 is closed. Opening through the peripheral surface thereof the support 12 has a circumferentially extending slot 20 therein.

The housing 13 includes an enlarged externally threaded head portion 21 which is positioned in the threaded aperture 15 of the support 12. The housing 13 further includes an elongated cylindrical recess 22 which opens through the head end thereof and is the same diameter as the support aperture 17.

Positioned in the support recess 16 I provide a sleeve member 23 which has an aperture 24 therein of the same diameter as the support aperture 17. Furthermore the sleeve member 23 includes an operating arm 25 which projects outwardly through the support slot 20. The opposite faces of the sleeve 23 each has an anti-friction bearing raceway 26 therein filled with a plurality of anti-friction members 27. The members 27 on one side engage the bottom of the support recess 16 and on the opposite side engage the face of the housing head portion 21.

Positioned in the housing recess 22 the sleeve aperture 24 and the support aperture 17 I provide a movable cylinder member 28. The cylinder 28 has an elongated cylindrical recess 29 therein which opens through the end thereof towards the dust cap 19. Adjacent the open end thereof the cylinder includes a reduced externally threaded portion 30 which is engaged by a threaded cap member 31 to close the end of the cylinder. The opposite end of the cylinder 28 includes a reduced externally threaded portion 32 which has a recess 33 therein. Adjacent the reduced portion 32 the cylinder has an aperture 34 therein which opens into the recess 29 and the recess 33.

In the outer face thereof the cylinder 28 has a plurality of straight longitudinal spline keyways 35 therein in which spline keys 36 mounted in slots in the housing 13 are positioned. The keys 36 are held in place by a collar 36' which as shown tightly engages the housing. Furthermore the cylinder 28 has a plurality of spiral spline keyways 37 in the outer face thereof in which spline keys 38 mounted in the sleeve 23 are positioned. (See Figs. 2 to 5 inclusive.)

From the foregoing it will be apparent that when the cylinder 28 is moved longitudinally the spline keys 36 will prevent rotation thereof and the spiral keyways 37 through the medium of the spline keys 38 will cause the sleeve 23 to rotate.

All the keyways and keys are preferably formed as shown in Fig. 6 with the side walls thereof converging inwardly so that the plane of the side walls meet at the axis of the cylinder. This assures a proper fit for the keys.

Positioned in the cylinder 28 and the housing 22 I provide a stationary hollow piston rod 40. The piston rod 40 is positioned in the aperture 34 of the cylinder and extends out of the housing 13 through an aperture 41 in the end wall thereof. The outer end of the piston rod 40 includes a threaded portion 42 which is positioned in a threaded recess 43 of a header member 44. Positioned on the threaded portion 42 of the piston rod within the housing I provide a lock nut 45 which when tightened against the end wall of the housing together with the header 44 firmly secures the piston rod 40 in position.

Surrounding the piston rod 40 at each end thereof I provide packing means 46 which is retained in position by a threaded cap member 47 engaging the threaded cylinder portion 32.

Within the cylinder recess 29 the piston rod 40 includes an enlarged flange portion 48 and spaced from the flange 48 the inner end of the piston rod includes an externally threaded portion 49 on which a nut 50 is positioned.

Surrounding the piston rod 40 between the flange 48 and the nut 50 I provide a packing 51. The flange 48, nut 50 and packing 51 constitute, in effect, a piston. The piston rod 40 has a recess 52 therein which opens through the threaded end 42 thereof and at the other end terminates in a reduced threaded aperture 53. The flange 48 includes an aperture 52' which affords communication between the interior of the piston rod 40 and the exterior thereof.

Positioned in the piston rod 40 I provide a tube 54 the outer diameter of which is less than the diameter of the piston rod recess 52. The tube 54 at one end extends beyond the threaded end 42 of the piston rod and adjacent the opposite end includes an enlarged head portion 55 which engages the bottom of the piston rod recess 52.

Beyond the head 55 the tube 54 includes a reduced externally threaded portion 56 which is positioned in the threaded piston aperture 53.

As shown the header 44 has a reduced recess 57 therein in the bottom of the threaded recess 43 and coaxial with the recess 57 and opening through the outer face thereof the header has a threaded recess 58 therein. Coaxial with the recesses 57 and 58 the header has an aperture 59 therein opening into both the recesses 57 and 58.

Positioned in the threaded recess 58 I provide a threaded conduit nipple 60 which has an enlarged recess 61 opening through the inner face thereof in which the outer end of the conduit 54 is positioned.

Spaced from the recess 58 the header 44 includes a threaded recess 62 opening into the bottom of which is a reduced recess 63. The header furthermore includes an aperture 64 one end of which opens into the recess 57. Positioned in the threaded header recess 62 I provide a threaded conduit nipple 65.

For actuating the control member 10 I provide one or more operating members each of which is indicated generally at 70. As shown each device 70 includes a body portion 71 which at one end includes an externally threaded portion 72. Opening through the threaded end thereof the body 71 has a cylindrical recess 73 therein and opening into the recess 73 the body has an elongated cylindrical recess 74 therein. Adjacent the threaded end thereof the body 71 includes an elongated boss 75 extending therefrom which has an aperture 76 therein opening into the recess 74 adjacent the recess 73.

One end of a conduit 77 is connected to the boss 75 by a suitable coupling member 78 and the opposite end is connected to the conduit nipple 60 of the device 10 by a suitable coupling member 79.

Adjacent the closed end thereof the body 71 includes an elongated boss 80 extending therefrom which has an aperture 81 therein opening into the recess 74.

One end of a conduit 82 is connected to the boss 80 by a suitable coupling member 83 and the opposite end is connected to the conduit nipple 65 of the device 10 by a suitable coupling member 84.

The boss 75 includes an inlet portion 85 and the boss 80 includes a similar inlet portion 86. One end of a conduit 87 is connected to the inlet portion 85 by a suitable coupling member 88 and the opposite end is connected to the boss 86 by a suitable coupling member 89. Interposed in the conduit 87 I provide a shut off valve 90.

Positioned on the body 71 I provide a cap member 91 which includes a head portion 92 and a reduced elongated portion 93. The body portion 92 has a threaded recess 94 therein in which the threaded portion 72 of the body 71 is positioned. The cap 91 has a cylindrical aperture 95 therein which opens into the recess 94 and the outer end of the elongated portion 93 includes a threaded portion 96.

Positioned in the aperture 95 adjacent the outer end thereof I provide a plug member 97 which has an aperture 98 therethrough. The plug member 97 includes an enlarged circular flange portion 99 positioned inwardly from the outer end thereof and which engages the end of the cap portion 93.

For rotatably securing the plug member 97 in position I provide a cap member 100 which has a threaded recess 101 therein in which the threaded portion 96 of the cap 91 is positioned. Opening into the bottom of the recess 101 the cap 100 includes a recess 102 and opening through the end thereof and into the recess 102 the cap includes an aperture 103.

The flange portion 99 of the plug 97 is positioned in the cap recess 102 and the outer portion of the plug 97 is positioned in the cap aperture 103.

Positioned in the aperture 95 of the cap 91 and the recess 74 of the body 71 and extending beyond the end of the body 71 I provide a piston rod 105. The end of the piston rod 105 in the body recess 74 includes a threaded portion 106 on which a nut 107 is positioned. Spaced from the threaded portion 106 the piston rod includes an enlarged flange portion 108. Surrounding the piston rod 105 between the nut 107 and the flange 108 I provide a packed piston head 109.

Opening through the end thereof opposite the piston head the piston rod 105 has an elongated threaded recess 110 therein in which a threaded stem 112 is positioned.

The threaded stem 110 includes a reduced portion 113 which is positioned in the aperture 98 of the plug member 97. A pin 113' causes the plug 97 and stem 110 to turn together. Beyond the plug 97 the reduced stem portion has an operating hand wheel 114 thereon. Surrounding the piston rod 105 at each end of the recess 73 of the body 71 I provide packing means 115.

From the foregoing it will be apparent that when the threaded stem 112 is rotated by means of the hand wheel 114 it will move the piston rod and piston head longitudinally within the recess 74 of the body 71.

Associated with the operating member 70 I provide a pair of pressure equalizing reservoirs 116 and 117. The reservoirs 116 and 117 are of similar construction and each includes a hollow cup like body 118 which adjacent its open end includes an internally threaded portion 119. Engaging the threaded portion 119 I provide a cap member 120 which has a small breather aperture 121 therethrough opening into the interior of the body 118.

Positioned in the body 118 I provide a cup shaped piston 122 the open end of which is towards the cup 121. Opposite the open portion thereof the piston has a cup shaped packing member 123 thereon the open face of which is towards the closed end of the body 118. Positioned in the cupped portion of the piston 122 I provide a coiled spring 124 which engages the cap 120 and urges the piston towards the closed end of the body. The closed end of the body 118 includes an outlet portion 125.

Intermediate the body 71 and the inlet 85 the boss 75 includes an inlet 126 passageway through which is controlled by a ball check valve mechanism 127. The check valve 127 operates to allow free passage into the boss aperture 76 from the inlet 126 and prevents passage out of the aperture 76 into the inlet 126.

Similarly intermediate the body 71 and the inlet 86 the boss 80 includes an inlet 128 passageway through which is controlled by a ball check valve mechanism 129. The check valve 129 operates to allow free passage into the boss aperture 81 from the inlet 128 and prevents passage out of the aperture 81 into the inlet 128.

One end of a conduit 130 is connected to the inlet 126 of the boss 75 by a suitable coupling member 131 and the opposite end is connected to the outlet 125 of the reservoir member 116 by a suitable coupling member 132.

One end of a conduit 133 is connected to the inlet 128 of the boss 80 by a suitable coupling member 134 and the opposite end is connected to the outlet 125 of the reservoir member 117 by a suitable coupling member 135.

In operation the cylinder 28 of the device 10, the recess 74 of the device 70, the bodies of the devices 116 and 117 below the pistons therein and the various interconnecting conduits are filled with oil or other liquid. The valve 90 is closed and the piston head 109 is moved as previously described to one end of the recess 74. The valve 90 is then opened and then again closed and the piston head 109 is then moved to the opposite end of the piston. By repeating this manuever several times it will assure the same amount of fluid being in the system on both sides of the packing 51 and the piston head 109. After the valve is finally closed should the fluid in either side of the system diminish due to leakage the equalizer reservoir will supply the diminished fluid. For instance, should the fluid in the conduit 77 diminish the spring pressed piston 122 of the device 116 will immediately force fluid through the conduit 130 and by the check valve 127 into the boss aperture 76.

When the piston head 109 of the operating member 70 is moved towards the cap 91 it forces fluid from the recess 74 through the boss 75, the conduit 77 and the nipple 60 into and through the conduit member 54 into the cylinder 29 on the side of the piston head 51 towards the cap 31 thereby forcing the cylinder 28 outward from the housing 13.

When the piston head 109 of the operating member 70 is moved towards the boss 80 it forces fluid from the recess 74 through the boss 80, the conduit 82 and the nipple 65 into the header recess 63, thence through the aperture 64 into the recess 57 from which it passes into the piston rod recess 52 and out therefrom through the aperture 52' into the cylinder recess 29 on the side of the piston packing 51 towards the cap 47 thereby forcing the cylinder 28 towards the header 44.

When it is desired to provide two operating members 70 for independently actuating the control member 10 as shown in Fig. 1 a T-fitting 136 is interposed in the conduit 77 and a similar fitting 137 is interposed in the conduit 82.

One end of a conduit 138 is connected by a suitable coupling member 139 to the fitting 136 and the opposite end is connected by a suitable coupling member 140 to the boss 75 of the second operating member 70.

Likewise one end of a conduit 141 is connected by a suitable coupling member 142 to the fitting 137 and the opposite end is connected by a suitable coupling member 143 to the boss 80 of the second operating member 70.

In Fig. 7 I illustrate an adaptation of the system to the steering gear of an automobile. In this arrangement two control members 145 are secured to the front axle 146 and a single operating member 147 is secured to a suitable support portion 148. The control members 145 are each similar to the previously described control member 10 and like portions thereof are indicated by similarly primed reference numerals. Also the operating member 147 is similar to the operating member 70 and like portions thereof are indicated by similarly primed reference numerals.

In this installation the conduits 77' from the control members 145 are connected through a fitting 149 to a single conduit 150 which in turn is connected by a suitable coupling member 151 to the boss 75' of the operating member 147. The conduits 82' from the control members 145 are connected through a fitting 152 to a single conduit 153 which in turn is connected by a suitable coupling member 154 to the boss 80' of the operating member 147.

The operating arm 25' of each of the control members 145 is connected through a suitable link mechanism 155 to its associated steering knuckle 156.

The shaft 113' of the operating member 147 has a regulation automobile steering wheel 157 mounted thereon.

Thus it will be seen that when the steering wheel 157 is rotated it will actuate the device 147 in the same manner as previously in connection with the device 70 and the device 147 will actuate the control members 145 in the same manner as previously described in connection with the device 10 whereupon the operating arms 25' of the devices 145 will through the medium of the links 155 swing the steering knuckles 156.

From the foregoing description it will be apparent that I have provided a novel hydraulically operated member and means for actuating the same.

Having thus described my invention I claim:

1. In a device of the class described, a control member including a housing having a bore therein closed at one end, a movable cylinder in said bore, a sleeve member in said housing and rotatable about said cylinder, said housing having a slot, an arm on said sleeve positioned in said slot, means to prevent rotation of said cylinder when it moves, means to cause rotation of said sleeve when the cylinder moves, a piston within the cylinder, a hollow piston rod extending through the cylinder end and connecting the piston to the housing, a hollow tube within the piston rod, and passage means connecting the interior of the piston rod to the cylinder on one side of the piston and the interior of the tube to the cylinder on the other side of the piston.

2. In a device of the class described, a housing having a bore therein and closed at one end, a movable cylinder in said bore, said housing having a chamber, a sleeve member positioned in said chamber, said housing having an elongated slot therein, an arm on said sleeve positioned in said slot, a plurality of longitudinally extending straight spline keyways in the outer surface of said cylinder, a plurality of splines mounted in said housing and positioned in said spline keyways, a plurality of helically arranged spline keyways in the outer surface of said cylinder, a plurality of spline keys mounted in said sleeve and positioned in said helical keyways, said cylinder having closed ends and having an aperture in one end opening into said housing bore, a piston rod positioned in said cylinder aperture, said piston having a piston thereon, the closed end of said housing having an aperture through which said piston rod extends, means to secure said piston rod to said housing and means to supply fluid to each side of said piston.

3. In a device of the class described, a housing having a bore therein and closed at one end, a movable cylinder in said bore, said housing having a chamber, a sleeve member positioned in said chamber, said housing having an elongated slot therein, an arm on said sleeve positioned in said slot, a plurality of longitudinally extending straight spline keyways in the outer surface of said cylinder, a plurality of splines mounted in said housing and positioned in said spline keyways, a plurality of helically arranged spline keyways in the outer surface of said cylinder, a plurality of spline keys mounted in said sleeve and positioned in said helical keyways, said cylinder having closed ends and having an aperture in one end opening into said housing bore, a piston within the cylinder, a hollow piston rod extending through the cylinder end and connecting the piston to the housing, a hollow tube within the piston rod, and passage means connecting the interior of the piston rod to the cylinder on one side of the piston and the interior of the tube to the cylinder on the other side of the piston.

GEORGE E. BARNHART.